United States Patent [19]
Delattre

[11] 4,246,305
[45] Jan. 20, 1981

[54] DRAINAGE STRUCTURE AND PROCESS

[75] Inventor: Henri Delattre, Voulx, France

[73] Assignee: Solentanche-Entreprise, Nanterre, France

[21] Appl. No.: 888,934

[22] Filed: Mar. 22, 1978

[51] Int. Cl.³ .................... E02B 11/00; B05B 15/00; B28B 1/48; B29C 17/08
[52] U.S. Cl. .................................... 428/36; 239/450; 264/154; 264/156; 264/177 R; 405/39; 405/43; 405/50; 405/51; 405/36; 428/131
[58] Field of Search ............. 34/95, 9; 52/302, 309.7; 428/122, 167, 36, 131; 264/154, 156, 177 R; 405/51, 50, 39, 43, 36; 239/450

[56] References Cited
U.S. PATENT DOCUMENTS

| | | | |
|---|---|---|---|
| 2,621,075 | 12/1952 | Sedar | 239/450 |
| 2,749,180 | 6/1956 | Andrews | 239/450 |
| 2,802,530 | 8/1957 | Kaufman | 264/156 |
| 2,814,529 | 11/1957 | Arnt | 405/43 |
| 3,079,620 | 3/1963 | Hunter | 34/95 |
| 3,080,124 | 3/1963 | Rothmann | 239/450 |
| 3,274,315 | 9/1966 | Kawamura | 264/177 R |
| 3,973,329 | 8/1976 | Feess | 34/95 |
| 4,042,741 | 8/1977 | Bright | 428/122 |
| 4,057,500 | 11/1977 | Wager | 405/43 |
| 4,095,750 | 6/1978 | Gilead | 405/43 |
| 4,113,818 | 9/1978 | Drossbach | 264/154 |

*Primary Examiner*—William R. Dixon, Jr.
*Attorney, Agent, or Firm*—Gifford, VanOphem, Sheridan & Sprinkle

[57] ABSTRACT

This invention relates to drainage by use of elongated strips of such a physical structure that they allow an exchange of fluids between their core and the medium in which they are placed. The drainage strips are used by vertically placing them in wet soils to evacuate water contained in said soils by use of a pressure differential exerted upon the water due to the pressure of the soil layer over the atmospheric pressure in the interstices of the drainage structure.

4 Claims, 2 Drawing Figures

DRAINAGE STRUCTURE AND PROCESS

BACKGROUND OF THE INVENTION

Such strips have been proposed under several forms. All of these, however, suffer from any of several serious drawbacks. Some are comprised of decomposing materials while others are easly clogged by the particles of soil and, still others, suffer from a reduced longitudinal or transversal permeability because of the pressure of the soil. Some allow too large a particle to pass. Some are too rigid and some are too weak.

This invention provides an easy to build, inexpensive, efficient structure in which all of the above drawbacks are eliminated.

It is to be understood that this new drain, although well adapted to the evacuation of water in a soil formation can also easily be used for a number of other applications in which the fluid exchange is from the soil towards the structure or vice versa.

SUMMARY OF THE INVENTION

Basically, this invention provides elongated strips having a structure that causes an exchange of fluids between their cores and the medium in which they are placed.

The strips are flat, hollow structures formed by extruding a polyolefin such that at least two longitudinal channels are formed by several longitudinal walls with the external longitudinal walls being punched according to the anticipated usage, i.e., in consideration of fluid rate; pressure differential between fluid in the channels and fluid in the medium; weight and granularity of the medium; and depth of the drainage strip.

Such definition encompasses all structures and uses of this type and whether placed vertically, hoizontally, or at a slant in a medium to dry, to wet, to introduce a fluid into, or to extract a fluid from, a medium. The properties and characteristics of these structures are similar because of the formation process.

DESCRIPTION OF THE PREFERRED EMBODIMENTS

According to this invention, it is possible to obtain by extrusion of a polyolefin such as polyethylene, hollow structures comprising a comparatively thin hollow strip, in which simultaneously extruded walls form longitudinally extended channels.

To be efficient in this application, the external walls of the structure, which can be flat or corrugated, should be punched with holes the form, size, and distribution thereof being such that they allow and promote the flow of the fluid from the external environment toward said channels, or vice versa.

Figure 1:
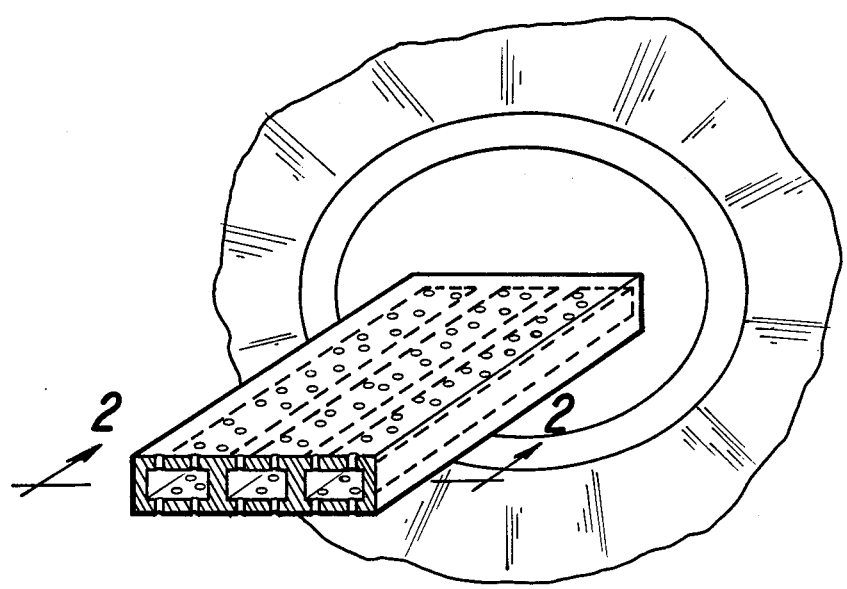
FIG. 1 is a perspective view of a structure according to the invention, extruded from an extrusion head.
Figure 2:
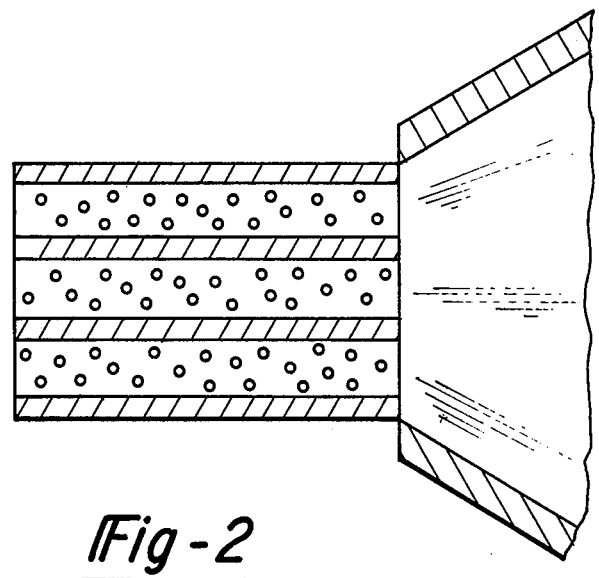
FIG. 2 is a horizontal section to the horizontal symmetry plane of FIG. 1.

As shown in FIGS. 1 and 2, the drain structure is extruded from an extrusion head 1 producing a flattened, hollow polyethylene strip 2. The opposed flat faces 3 and 4 are connected by vertical walls 5 and 6 so as to define longitudinal channels 7, 8, and 9. The opposed flat faces 3 and 4 are perforated as shown by 10, 11, etc. to allow a communication between the channels 7, 8, and 9 and a medium exterior of the strip. The perforation can be obtained by punching.

One way to obtain such punching, is to roll upon at least one face of the structure a cylinder with a plurality of points of about 0.1–0.5 mm., in the extrusion area, i.e., at the moment when flowing out of the extruder, the structure is still comparatively soft.

It is therefore possible to punch the structure with holes having a size, distribution, and frequency which cause the exchange of fluids.

It is clear that the pressure exerted by the soil upon the fluid to be collected depends upon the depth to which the structure is buried. Similarly, the holes should be small enough to prevent clogging of the holes by the soil particles depending on the granularity of the medium.

An important use of the structure is a drain which is placed vertically below several decameters of soil. The soil pressure squeezes the water from the soil and forces it through the holes into the vertical channels of the drain. The size and number of said holes varies in accordance with the granularity the pressure exerted upon the fluid, the soil or medium, and the depth of the drain.

In practice, several drains with holes of different size and numbers should be buried in the given soil to be sure that the water will be fully drained. According to another modification, the punching of the holes can be obtained by a laser ray of the proper section scanning the strip as it is extruded.

According to still another modification, it is possible to introduce chemicals, for example, sugar or salt, into the material to be extruded. This is done by a microscopic charge capable of dissolution by passing the strip in a proper solvent, for example water. The statistical distribution of said charges causes holes to be formed with the same distribution after dissolution.

In addition, modification can be made in the shape of the walls and channels to be extruded. Channels of circular or elliptic section, connected or slightly spaced, can be formed depending on the use of the structure.

For example, when burying the structure in a soil to be dried, the channels can be used to dry concrete or erected walls, or to bring humidity into gardens or other materials when required.

The advantages of such structues are not only that they can be produced in any size or with any characteristic required for a given use, but also that they are flexible, shockproof, made to any desired length, made of any color for identification purposes and easily bundled.

Any olefin can be used such as polyethylene, polypropylene, or polybutylene depending on the specific properties required.

The qualities and advantages of the drain against the prior drains have been qualitatively and quantitatively tested in laboratories and in the ground. The results are summarized hereinafter.

I. Laboratory experiments. In conditions simulating the actual use of the drains the following performances have been tested:
 1. Longitudinal and transversal permeabilities under variable ground pressure (see Table A, page 6);
 2. "Passing power" = particle size passing through the holes of the drain (see Table B, page 6).

To measure the permeabilities, the tested drain is wrapped in a thin rubber sheet and placed in a pressurized environment, such as a tank filled with sand or water at different levels to simulate variable pressures. The longitudinal permeability from the bottom to the top is noted.

A window is cut into the rubber sheet at a given level and the combined transversal and longitudinal permeability are noted.

To measure the "Passing Power", the drain is dipped into a bath containing a water suspension of different soils (mud, bentonite, kaolin, sand). After a minimum time of four hours, the materials retained in the holes of the drain are given a granulative analysis. The tested drains were:

O—Drain according to the invention, comprising seven holes of 0.2 mm/cm$^2$;
I—Grooved polyethylene core wrapped by a Kraft paper sheath;
II—Strip made of two microporous PVC strips;
III—Tagged non-woven textile;
IV—Slightly grooved core of polyethylene between two strips of non-woven non-tagged textile.

The results are given in the two following tables:

TABLE A

| DRAIN | weight g/ml | Longitudinal permeability in ml/min under a variable pressure of 0.15 to 3 bars under | | Combined Longitudinal and transversal permeability ml/min under 0.5 bar |
|---|---|---|---|---|
| | | WATER | MUD | |
| O | 44 | 1455 to 1180 | 1140 to 1010 | 2600 |
| I | 164 | 1450 to 1370 | 1540 to 1480 | 2300 |
| II | 102 | 410 to 330 | 700 to 510 | 1300 |
| III | 60 | 465 to 100 | 150 to 40 | |
| IV | 150 | 90 to 13 | 40 to 4 | |

TABLE B

| DRAIN | PASSING POWER | | Residual transversal permeability ml/sec/cm$^2$ |
|---|---|---|---|
| I | All retained | | $10^{-4}$ |
| O | pass | $<20\ \mu$ | $10^{-2}$ |
| II | pass | $<5\ \mu$ | $10^{-4}$ |
| III | pass | $<100\ \mu$ | $10^{-2}$ |
| IV | pass | $<50\ \mu$ | $10^{-2}$ |

It is clear from these results that the drain of the invention is superior to the prior art drain, although number I has nearly equivalent longitudinal permeability. On the other hand, the drain of the invention possesses additional advantages over drain number I.

The drain of the invention is made of a single strip whereas drain number I is made of a polyethylene core with the paper sheath. It follows that the drain of the invention is much cheaper and much simpler to obtain, even for use with small equipment. Moreover, the paper of drain number I is very weak, is sensitive to humidity during storage, and is easily torn during shipping especially under rain. The drain of the invention is also elastic withstanding elongation of 50% or more. This enables it to conform to the distortions of the ground which is not possible with drain number I.

In summary, the drain of the invention is definitely superior to any other.

II. Service tests. The above conclusions have been confirmed by actual tests made in France by an Official Public Service, with a view to building, over a soil area, two 120,000 metric ton tanks of liquified methane. To take into account the compressibility of the ground which could lead to differential squeezing and sinking a vertical drainage was constructed to expel the interstitial water from below the building site with drains of the invention and with drains number I.

a. Drain of the invention: a strip of section 3×95 mm comprising two polyethylene walls punched with holes of 0.1–0.2 mm with 26 intermediate walls forming 25 longitudinal channels.
b. Drain number I: flat strip of polyethylene of section 4×97 mm with 56 parallel grooves wrapped with paper.

On the top of the ground were placed 24 "tassometers" which measure sinking and show a consolidation of the muds as a function of time. The "tassometer" is of the GLOTZL type, which gives, by compressed air compensation, the pressure of a water column wherein the top is observed by leveling.

The first charge was 3.3 m high in early October, 1977, and the measurements were noted until the end of January, 1978.

Figure 3:
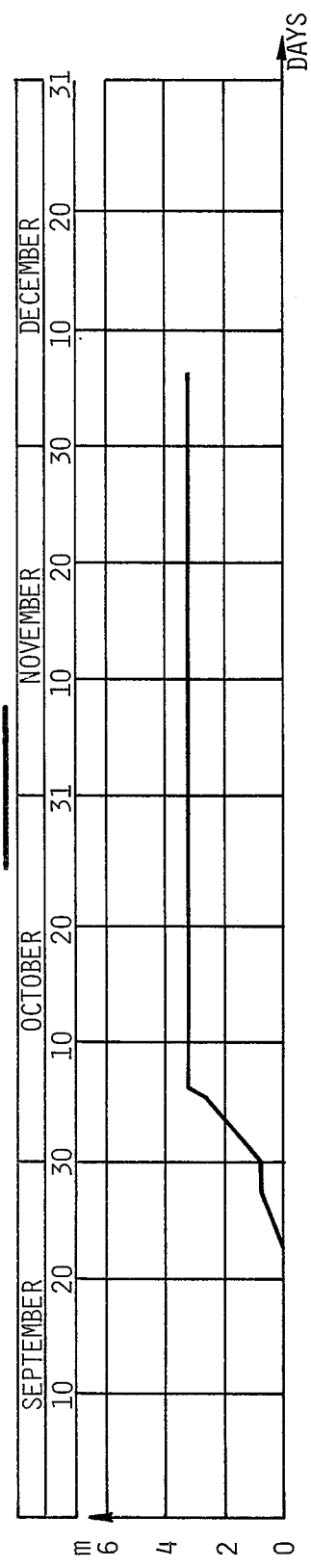
FIG. 3 is a graph depicting variations in the liquid charge of a large tank.
Figure 4:
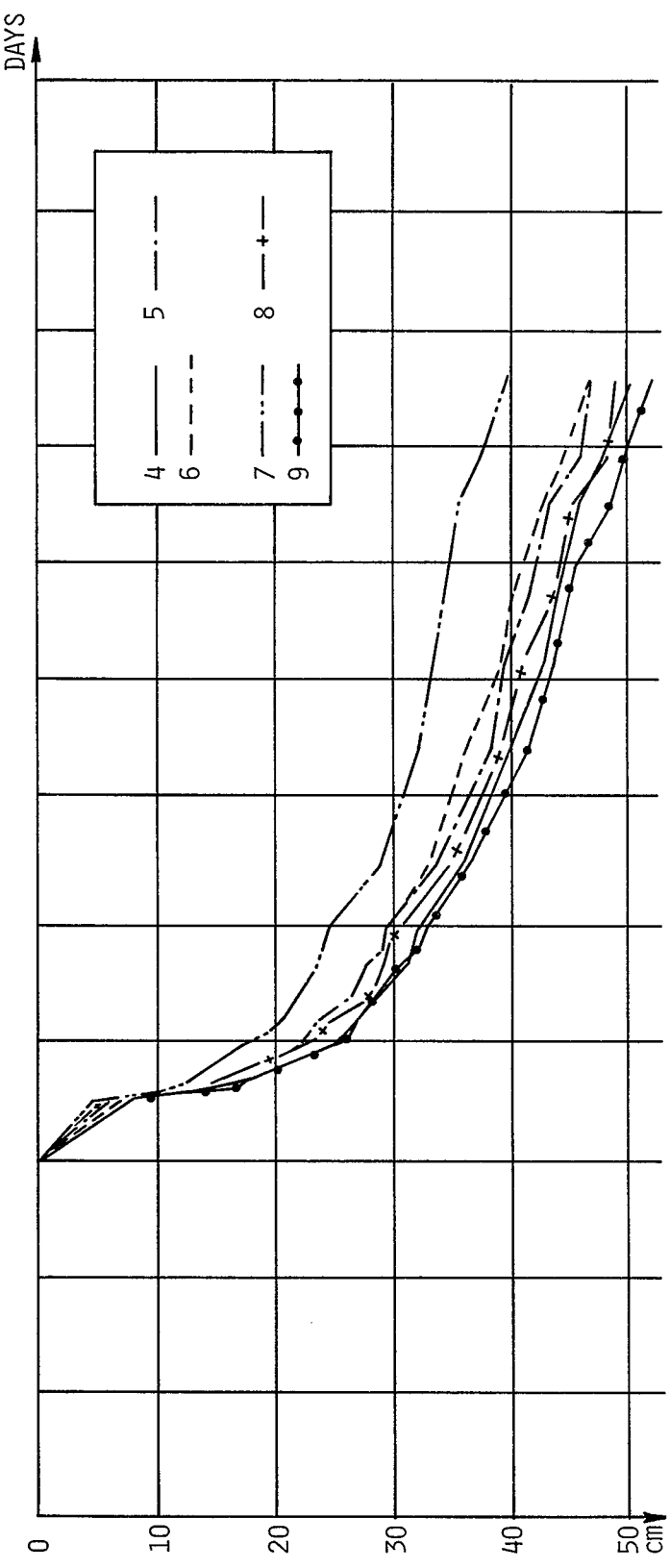
FIG. 4 is a graph comparing the operation of drains according to the invention with known drains.

The results are given in the graphs. FIG. 3 shows variations of the charge in meters with time in days. FIG. 4 shows variations of sinking in centimeters during the same time. Curves 4, 5, and 6 have been obtained from the previously known drains of number I, and curves 7, 8, and 9 from the drains of the invention.

The results obtained were substantially equivalent. Considering the practical and cost advantages of the drain of the present invention it is shown to be definitely superior.

What is claimed is:

1. A durable underground drain of improved permeability for exchanging fluids between mediums in which said drain is placed, said drain comprising:
    a flat, elongated, flexible, polyolefin strip, said strip having about 25 channels of cross-sectional area less than 1 cm$^2$ extending longitudinally therethrough, said strip having at least one end open;
    said strip further having two opposed external walls, both of said walls having perforations of about 0.1 to 0.5 mm diameter each so as to communicate with said plurality of channels;
    so that when said drain is placed in a medium, fluid will flow between said medium and said plurality of channels according to the pressure differential between said plurality of channels and said medium.

2. A process for forming a drain, said drain being in the form of a flat, elongated, polyolefin strip, said strip having a plurality of channels extending longitudinally therethrough, said strip further having external walls, said walls having perforations so as to communicate with said plurality of channels, said process comprising the steps of:
    (a) extruding polyolefin as a flat, elongate strip having a plurality of channels extending longitudinally therethrough, said strip further having external walls and at least one end open; and
    (b) perforating said walls with a pointed cylinder rolling upon said strip after it is extruded.

3. A process for forming a drain, said drain being in the form of a flat, elongated, polyolefin strip, said strip having a plurality of channels extending longitudinally therethrough, said strip further having external walls, said walls having perforations so as to communicate with said plurality of channels, said process comprising the steps of:

(a) extruding polyolefin as a flat, elongate strip having a plurality of channels extending longitudinally therethrough, said strip further having external walls and at least one end open; and (b) perforating said walls with a laser ray scanning said strip after it is extruded.

4. A process for forming a drain, said drain being in the form of a flat, elongated, polyolefin strip, said strip having a plurality of channels extending longitudinally therethrough, said strip further having external walls, said walls having perforations so as to communicate with said plurality of channels, said process comprising the steps of:

(a) dispersing microscopic fillers in the polyolefin to be extruded;

(b) extruding said polyolefin as a flat, elongate strip having a plurality of channels extending longitudinally therethrough, said strip further having external walls and at least one end open; and (c) passing said strip through a solvent so as to dissolve said microscopic filler when the strip passes through said solvent, therefore perforating said walls of said strip.

* * * * *